United States Patent [19]

Gavagan

[11] Patent Number: 5,054,815
[45] Date of Patent: Oct. 8, 1991

[54] SHOULDER BELT COMFORT MECHANISM

[75] Inventor: James A. Gavagan, Centerline, Mich.

[73] Assignee: Takata, Inc., Auburn Hills, Mich.

[21] Appl. No.: 487,654

[22] Filed: Mar. 2, 1990

[51] Int. Cl.$^5$ .............................................. B60R 22/18
[52] U.S. Cl. .................... 280/808; 188/65.1; 297/483
[58] Field of Search ...................... 242/107.2; 280/808, 280/805, 806, 801, 807; 24/170, 191; 297/483, 470, 474; 188/65.1

[56] References Cited

U.S. PATENT DOCUMENTS

| 598,776 | 2/1898 | Gosnell | 188/65.1 |
|---|---|---|---|
| 887,344 | 5/1908 | Nelson | 188/65.1 |
| 903,433 | 11/1908 | Baker | 188/65.1 |
| 2,075,214 | 3/1937 | Lorentzen | 188/65.1 |
| 3,123,182 | 3/1964 | Malone | 188/65.1 |
| 4,209,142 | 6/1980 | Booth et al. | |
| 4,310,175 | 1/1982 | Pickett | |
| 4,547,018 | 10/1985 | Cunningham | |
| 4,549,769 | 10/1985 | Pilarski | |
| 4,669,680 | 6/1987 | Nishimura et al. | |
| 4,682,791 | 7/1987 | Ernst | |

FOREIGN PATENT DOCUMENTS 1531415 11/1975 United Kingdom .

Primary Examiner—Charles A. Marmor
Assistant Examiner—Karin Tyson
Attorney, Agent, or Firm—Harness, Dickey & Pierce

[57] ABSTRACT

An improved seat belt restraint system having a "comfort" feature for controlling tension in a shoulder belt. The comfort feature partially relieves tension exerted by the seat belt retractor on the vehicle occupant, yet prevents excess slack from developing in the shoulder belt which can negatively affect occupant protection performance of the restraint system. A webbing guide is provided which forms the upper anchorage of the shoulder belt of the restraint system. The webbing guide includes a sensing lever which contacts the seat belt webbing and is moved through various angular positions in response to tension applied on the shoulder belt. When the sensing lever is in an angular position corresponding to excess slack in the webbing, the webbing can pass freely through the guide loop and the retractor can freely retract webbing. In the case where the shoulder belt is fastened on the user and a proper level of tension is provided, the sensing lever frictionally engages the webbing to partially offset the retraction force exerted by the retractor. When excess tension is applied to the belt webbing, frictional engagement with the webbing is also relieved, allowing additional webbing to be extracted from the retractor.

11 Claims, 2 Drawing Sheets

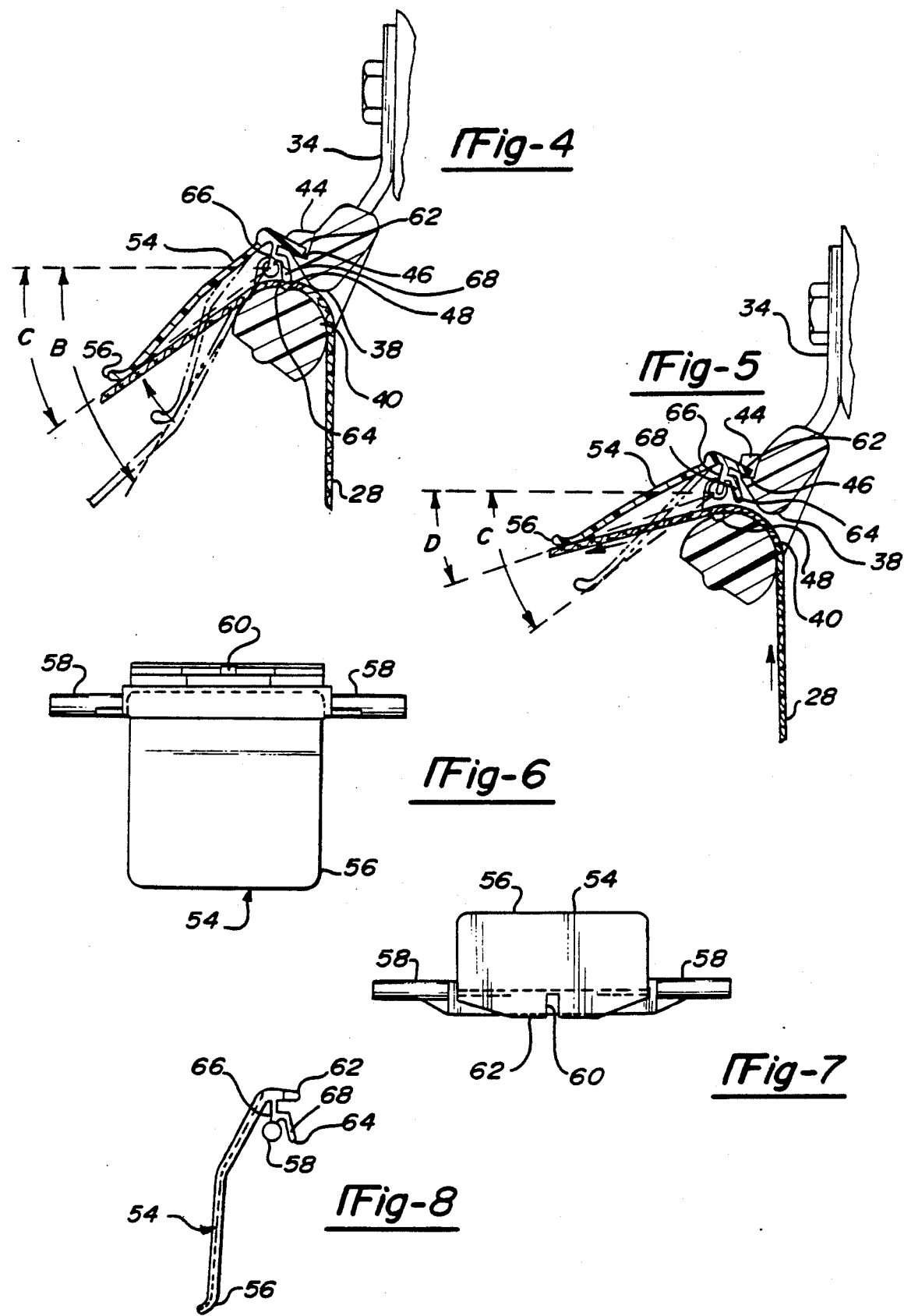

SHOULDER BELT COMFORT MECHANISM

BACKGROUND AND SUMMARY OF THE INVENTION

This invention relates to a motor vehicle occupant restraint system, and particularly to a device which controls slack in the shoulder belt segment of a belt type restraint system to provide occupant protection with enhanced comfort and convenience.

Present governmental regulations concerning passenger motor vehicles require systems to protect occupants in the event of impact. The most widely used restrants are seat belt systems. Seat belts control forward excursion of the occupant in a frontal impact and restrain the occupant within the vehicle. Typical seat belt restraint systems include a lap belt which passes across the occupant's pelvis, and a shoulder belt portion which diagonally crosses the occupant's upper torso. In order for seat belt restraint systems to operate effectively, they must be positioned against the occupant without a large amount of slack. Tension on the seat belt webbing is provided by a spring loaded retractor which enables the webbing to be stored on the retractor when the belt restraint system is not deployed. Although maintaining tension on seat belts is desirable from a occupant protection viewpoint, belt tension can be annoying to the occupant, particularly on the shoulder belt, and further creates a feeling of confinement.

In order to provide enhanced comfort and convenience for motor vehicle occupants, motor vehicle manufacturers offer so-called "comfort" features in belt systems. These features act as a brake or clutch which prevent the retractor from retracting webbing once the retractor reaches some "set" position. These devices generally operate in a manner similar to a conventional window shade mechanism in which the webbing is pulled out slightly and released to cause latching. Although such comfort features enable slack to be provided in the belt to enhance comfort and convenience, they can cause excess slack to occur which detracts from the belt systems ability to restrain the occupant. For such systems, as the occupant moves in the seat or reaches forward to operate instrument panel controls, the forward motion of the occupant can cause the comfort feature to be reset at a position which causes an excessive amount of slack to occur in the shoulder belt.

This invention is related to a comfort feature for a seat belt system which is mounted at the upper anchorage point of a shoulder belt, above one of the shoulders of the seat occupant. The device is referred to as a "snubber" which frictionally engages the shoulder belt webbing to restrict retraction of the belt webbing into the retractor. For those seat belt system designs having a retractor mounted near the floor of the vehicle, the comfort mechanism is incorporated into the guide loop assembly which acts as the upper anchorage for the shoulder belt. The guide loop includes a sensing lever which is pivotally mounted to the guide loop and is sensitive to the tension on the shoulder belt.

When proper tension is applied on the shoulder belt, the sensing lever is rotated upwardly into a "normal" operating range where it pinches the webbing, causing friction which restricts retraction. In this normal range, the comfort mechanism partially offsets the retraction force on the webbing exerted by the retractor, thus providing less tension on the belt against the occupant. If excess tension is present in the shoulder belt, which occurs for example, if the occupant moves forward and returns to the normal seating position; the sensing lever rotates to an upward position and the frictional engagement with the belt is relieved to allow webbing to be pad out from the retractor.

If there is insufficient tension on the shoulder belt webbing, the sensing lever rotates to a downward position which also relieves tension, allowing the retractor to retract webbing to snug the belt against the occupant. The embodiment of this invention shown and described herein can be provided in the form of a single unitary sensing lever, preferably made of a polymeric plastic material.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 4 is a cross-sectional view, also taken generally along line 3—3 of FIG. 2, showing the shoulder belt portion at a desired level of tension against an occupant.

FIG. 5 is another cross-sectional view taken generally along line 3—3 of FIG. 2 showing a condition of excess tension on the shoulder belt webbing.

FIG. 6 is a front view of the sensing lever component of the guide loop assembly according to this invention.

FIG. 7 is a top view of the sensing lever.

FIG. 8 is a side view of the sensing lever.

DETAILED DESCRIPTION OF THE INVENTION

Figures 1, 2, 3:
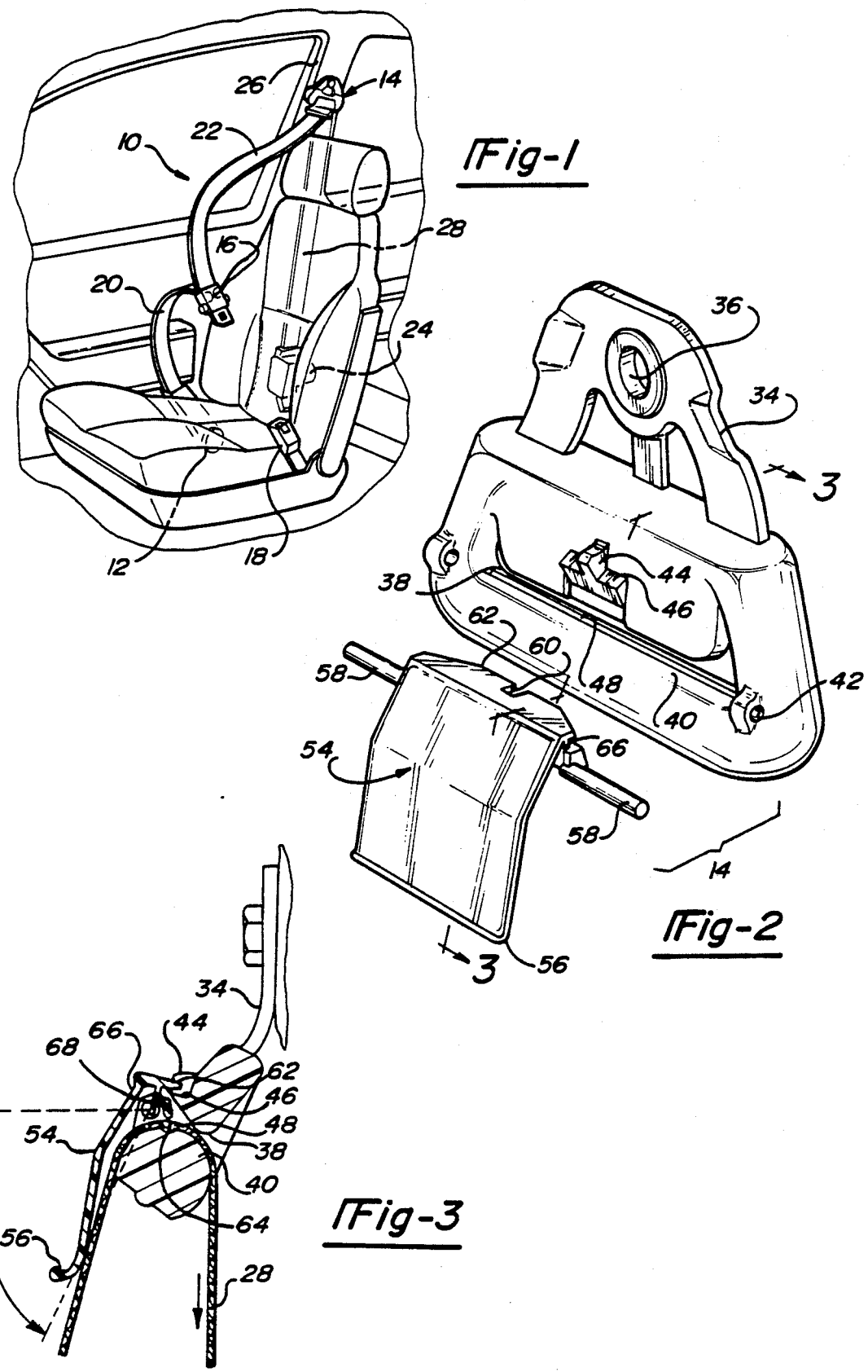
FIG. 1 is a pictorial view of a passenger side of a passenger motor vehicle showing a seat belt system incorporating the guide loop assembly of this invention.
FIG. 2 is an exploded view of the guide loop assembly according to this invention.
FIG. 3 is a cross-sectional view taken along line 3—3 of FIG. 2, showing the shoulder belt webbing in a slackened condition.

A seat belt restraint system incorporating features of this invention is shown in FIG. 1 and is generally designated there by reference number 10. Restraint system 10 generally includes a lower lap belt anchorage 12, an upper shoulder belt guide loop assembly 14, and a sliding "D" ring 16 which can be connected to buckle assembly 18. "D" ring 16 is shown detached from buckle 18 in FIG. 1. In a deployed condition, "D" ring 16 and buckle 18 would be engaged so that lap belt segment 20 of the seat belt webbing 28 extends across the pelvis of a user, whereas shoulder belt segment 22 extends diagonally across the wearer's upper torso. Retractor 24 is mounted in the lower portion of the vehicle hinge pillar 26 and includes a rewind spring which exerts a constant retraction force, tending to maintain seat belt webbing 28 in a taut condition when being worn by the occupant. Present retractors 24 typically incorporate an inertia sensitive mechanism which restricts withdrawal of webbing when the vehicle is subjected to deceleration levels above a predetermined magnitude, thus preventing webbing extraction in a vehicle crash. Guide loop assembly 14 incorporates features according to the present invention which restrict the travel of belt webbing 28 through the guide loop assembly when the restraint system is being used and when proper tension exists in shoulder belt segment 22.

Restraint system 10 shown in FIG. 1 incorporates a sliding "D" ring 16 which can be positioned along belt webbing 28 by the user to provide the proper length for lap belt segment 20 of the webbing. This invention of a comfort mechanism for controlling shoulder belt tension can be embodied in other designs for restraint systems, including dual retractor systems which have separate retractors for the lap belt and shoulder belt.

FIG. 2 is an enlarged pictorial view of guide loop assembly 14 shown in FIG. 1 incorporating features of the present invention. Guide loop 34 includes an upper anchorage hole 36 and has a slotted loop portion defining webbing passageway 38. Directly molded onto guide loop 34 is guide surface 40 over which webbing 28 slides as webbing is withdrawn from or retracted into retractor 24. Laterally disposed outboard of webbing passageway 38 is a pair of sensing lever pivot holes 42 which are coaxially aligned. Guide loop 34 further has a projecting locating tab 44 and an abutment surface 46. Guide surface 40 is preferably formed with a laterally extending depression or channel 48, as best shown in FIG. 3.

Sensing lever 54 includes a lever end 56 which contacts shoulder belt segment 22 to sense belt tension. Sensing lever 54 is attached to guide loop 34 by inserting projecting pivot shafts 58 into pivot holes 42. Locating notch 60 is formed in the upper flange 62 of sensing lever 54 and receives locating tab 44 to locate sensing lever 54 laterally. Flange 62 engages with abutment surface 46 once sensing lever 54 is rotated to a predetermined upward (clockwise) rotated position, as will be better explained below. Another flange 68 forms engagement surface 64 which is positioned to directly contact seat belt webbing 28 once sensing lever 54 reaches a predetermined angular position. Bending plate 66 is formed by a thin web extending between the section of sensing lever 54 defining shaft 58, flange 68 and engagement surface 64; and the section of the sensing lever forming lever end 56 and flange 62. The entire sensing lever 54 is preferably formed in one piece through molding of a polymeric plastic material such as ABS plastic.

FIGS. 3 through 5 show guide loop assembly 14 in various operating conditions in accordance with the present invention. The position of the elements shown in FIG. 3 corresponds to a condition where the belt restraint system 10 is either not deployed around the occupant or is in a condition where excess slack is present in shoulder belt segment 22 when it is being worn. In this condition, shoulder belt segment 22 extending between guide loop 34 and "D" ring 16 forms an angle which approaches vertical which is designated as angle A. In this condition, sensing lever 54 is rotated to a position such that flange 62 is not engaging sensing lever abutment surface 46, and further, engagement surface 64 does not frictionally engage belt webbing 28 to restrict retraction of the belt webbing into retractor 24. Accordingly, in this condition, the retraction effort exerted by retractor 24 causes retraction of the belt webbing to reduce slack in shoulder belt segment 22 or fully retracts the webbing when the belt system is not being used.

FIG. 4 illustrates the position of the elements when shoulder belt segment 22 has a desired level of tension which provides comfort and convenience for the occupant, yet maintains the webbing against the occupant. Tension on shoulder belt segment 22 causes sensing lever 54 to be lifted from angle A shown in FIG. 3, to at or beyond a smaller angle B. FIG. 4 shows a range of angles of sensing lever 54, between angles B and C, corresponding with this normal tension level in belt restraint system 10. In the position of sensing lever 54 shown in phantom lines and designated by angle B in FIG. 4, engagement surface 64 of the sensing lever contacts belt webbing 28 and pinches it against guide surface 40 and into channel 48. This pinching action creates friction on belt webbing 28 which inhibits retraction of the webbing into retractor 24. As additional tension is placed on shoulder belt segment 22, sensing lever 54 raises to the full line position shown in FIG. 4 and designated by angle C. In this range of positions of sensing lever 54 bending plate 66 undergoes bending flexure while lever flange 62 continues to remain out of engagement with abutment surface 46.

FIG. 5 represents the position of the elements of guide loop assembly 14 when excess tension is placed on shoulder belt segment 22. Such excess tension causes the angle of sensing lever 54 to decrease from angle C to a still smaller angle D. Rotation of sensing lever 54 past angle C causes flange 62 to engage abutment surface 46, which prevents further bending deflection of bending plate 66. This engagement point becomes a fulcrum such that continued upward displacement of sensing lever 54 places bending plate 66 in tension. This tension in turn exerts a bending load on the entire sensing lever 54, and in particular, on shaft 58 which causes engagement surface 64 to be pulled away from contact with belt webbing 28, thereby allowing belt webbing 28 to be freely withdrawn from retractor assembly 24 and relieving the excess tension condition.

The operation of belt restraint system 10 and in particular guide loop assembly 14 described above automatically adjusts slack in the shoulder belt 22 without active involvement by the occupant. The system provides free retraction of seat belt webbing when it is unfastened around the user and does not prevent the occupant from moving freely in the vehicle.

While the above description constitutes the preferred embodiments of the present invention, it will be appreciated that the invention is susceptible of modification, variation and change without departing from the proper scope and fair meaning of the accompanying claims.

I claim:

1. A guide assembly for seat belt webbing which selectively restricts retraction of the webbing into a retractor to provide enhanced comfort and convenience for a vehicle occupant by reducing the tension of the shoulder belt segment of the webbing which passes across the upper torso of the occupant, comprising:

guide means located to define an upper anchorage point for the shoulder belt segment, and defining a guide surface over which the belt webbing passes as the webbing is withdrawn from or retracted into the retractor, and further defining an abutment surface, a sensing lever affixed to the guide means by a pivot means for allowing the sensing lever to pivot and having an end contacting the webbing shoulder belt segment for sensing the tension on the webbing should belt segment such that the sensing lever is positioned within a first normal angular range corresponding to a desired tension level in the webbing shoulder belt segment, and positioned at a second angle outside of the normal angular range when the tension on the webbing shoulder belt segment is less than the desired tension level, and positioned at a third angle outside of the normal angular range when the tension on the webbing shoulder belt segment is greater than the desired tension, said sensing lever further having a flange which contacts said abutment surface when said sensing lever is in said third angular position, webbing engaging means formed by an engagement surface of the sensing lever for contacting the belt webbing and creating friction on the webbing thereby inhibiting retraction of the webbing when the sensing lever is in the first normal angular range, and wherein the engagement surface rotates with said sensing lever and moves out of contact with the webbing when the sensing lever is at the second angular position, and when said third position is reached said flange and said abutment surface engage to prevent continued rotation of said lever causing the engagement surface to be pulled from contact with the webbing.

2. A guide assembly according to claim 1 wherein the sensing lever further comprises a bending plate which undergoes bending deflection when the sensing lever is in the first normal range in response to changes in the position of the sensing lever, and is loaded in tension when the sensing lever flange contacts the abutment surface which causes deflection of one or more elements of the guide assembly causing the engagement surface to be pulled away from the webbing.

3. The guide assembly according to claim 1 wherein the guide means is a guide loop used with a retractor mounted below the guide loop such that the webbing from the retractor passes from the retractor, through the guide loop and across the occupant's upper torso.

4. The guide assembly according to claim 1 wherein the sensing lever sensing end contacts the webbing at a point between the guide means and the occupant such that, as the tension on the webbing increases, the sensing end is raised as the webbing between the guide means and the occupant approaches a horizontal condition.

5. The guide assembly according to claim 1 wherein the guide surface defines a concave channel and the engagement surface urges the webbing into the channel to increase friction on the webbing.

6. The guide assembly according to claim 1 further comprising interlocking means formed by the guide assembly to laterally locate the sensing lever with respect to the guide means.

7. The guide assembly according to claim 1 wherein the sensing lever is a single piece integral structure.

8. A guide assembly for seat belt webbing which selectively restricts retraction of the webbing into a retractor to provide enhanced comfort and convenience for a vehicle occupant by reducing the tension of the shoulder belt segment of the webbing which passes across the upper torso of the occupant, comprising:

a guide loop located to define an upper anchorage point for the shoulder belt segment and defining a guide surface over which the belt webbing passes as the webbing is withdrawn from or retracted into the retractor, a sensing lever attached to the guide loop above the guide surface by pivot means, the sensing lever having a first section having an end contacting the shoulder belt segment extending between the guide loop and the occupant and sensing the tension on the shoulder belt segment and a flange engageable with an abutment surface of the guide loop, the sensing lever having a second section having a belt engagement surface which can contact the webbing to frictionally engage the webbing, a bending plate extending between the first and second sensing lever sections wherein, when the sensing lever is positioned within a first normal angular range corresponding to a desired tension level in the shoulder belt segment, the belt engagement surface engages the webbing creating friction and inhibiting retraction of the webbing by the retractor, with the bending plate undergoing bending deflection within the normal range, and when the sensing lever is positioned at a second angle outside of the first range, caused by the webbing tension being less than the desired level, the engagement surface is rotated out of engagement with the webbing, and when the sensing lever is at a third angle caused by tension in the webbing above the desired level, the sensing lever flange engages said guide loop abutment surface causing the bending plate to be loaded in tension which causes deflection of one or more components of the sensing lever thereby pulling the engagement surface away from the belt webbing.

9. The assembly guide according to claim 8 wherein the guide surface defines a concave channel and the engaging means urges the webbing into the channel to increase friction on the webbing.

10. The assembly guide according to claim 8 further comprising interlocking means formed by the guide assembly to laterally locate the sensing lever with respect to the guide means.

11. The assembly guide according to claim 8 wherein the sensing lever is a single piece integral structure.

* * * * *